United States Patent [19]

Kawai et al.

[11] Patent Number: 4,832,349
[45] Date of Patent: May 23, 1989

[54] FORMED IN PLACE (FIP) GASKET ARRANGEMENT

[75] Inventors: Kouji Kawai; Eiichi Matsumoto; Masahiko Teramoto, all of Yokohama, Japan

[73] Assignee: Nissan Motor Company, Ltd., Japan

[21] Appl. No.: 162,589

[22] Filed: Mar. 1, 1988

[30] Foreign Application Priority Data

Mar. 5, 1987 [JP] Japan ............................. 62-32221[U]

[51] Int. Cl.⁴ ............................................. F16J 15/14
[52] U.S. Cl. ......................................... 277/12; 277/1;
277/235 B; 220/3.94; 220/4 R; 220/67;
123/198 E
[58] Field of Search .................... 277/1, 12, 178, 182,
277/183, 235 B; 220/3.94, 4 R, 62, 67; 123/198
E

[56] References Cited

U.S. PATENT DOCUMENTS 1,882,580 10/1932 Harris ...................... 220/4 R X
2,140,672 12/1938 Gray et al. ..................... 277/1 X
3,912,107 10/1975 Baumann ...................... 220/85 R X
3,948,407 4/1976 Puterbaugh ..................... 220/4 R
4,313,405 2/1982 Skatsche et al. ............ 123/198 E X
4,640,432 2/1987 Tate et al. ..................... 220/67 X

FOREIGN PATENT DOCUMENTS 611993 6/1979 Switzerland ........................... 277/1
911693 11/1962 United Kingdom ................ 277/183

Primary Examiner—Robert S. Ward, Jr.
Attorney, Agent, or Firm—Leydig, Voit & Mayer

[57] ABSTRACT

An FIP (Formed In Place) gasket arrangement includes three hollow parts which are joined with each other in such a way as to sealingly separate the inside and outside thereof. Two of the parts have surfaces which are flush with each other and adjoin at a line extending between the inside and outside of the two parts. The remaining one of the parts has a surface joined with the surfaces of the two parts by interposing therebetween an FIP gasket. The two parts also have edges extending along the above mentioned line, one of the edges being partially chamferred to provide a chamber. The FIP gasket has a portion filling the chamber.

9 Claims, 5 Drawing Sheets

FORMED IN PLACE (FIP) GASKET ARRANGEMENT

BACKGROUND OF THE INVENTION

1. Field of the Invention

The present invention relates in general to gaskets and particularly to FIP (Formed In Place) gaskets for an oil pan of an automotive engine or the like.

2. Description of the Prior Art

An FIP gasket is made of a room temperature setting material containing silicon and rubber as a basis. It is applied in a liquid state to the joining surfaces of two parts and then solidifies while copying the profiles of the joining surfaces. This type of gasket is progressively increasing in use in place of a preformed gasket, i.e., a gasket formed into a predetermined shape prior to installation. For example, it is used for providing a seal between the joining surfaces of an oil pan, front cover, etc. of an automotive engine.

An example of a prior art FIP gasket arrangement is shown in FIGS. 9-11. In this example, an FIP gasket 6 is used in an automotive engine to provide a seal between the joining surfaces 1a, 2a and 5 of a cylinder block 1, front cover 2 and an oil pan 4. A gasket 7 for providing a seal between the joining surfaces of the front cover 2 and the cylinder block 1 may be of the preformed type or, as shown in an enlarged scale in FIG. 10, of the FIP type. This gasket arrangement however has a problem that the gasket 6 has possibility of being separated from the joining surface 1a of the cylinder block 1 to form an opening 8 which will cause leakage of the oil pan 4, particularly when the front cover 2 is made of aluminium alloy whilst the cylinder block 1 is made of cast iron. This is due to the fact that when the engine is heated up to a high temperature, the joining surfaces 1a and 2a of the cylinder block 1 and front cover 2 are moved relative to each other to cause a gap indicated by the character "l" in FIG. 11 due to the large difference in thermal expansion between them, with the joining portion of the oil pan 4 being deformed correspondingly. Such movement may also occur, even if the cylinder block 1 and the front cover 2 are made of the same material, when they undergo heating and/or cooling by heat sources of largely different temperatures, respectively.

SUMMARY OF THE INVENTION

In accordance with the present invention, there is provided an improved and novel FIP gasket arrangement which comprises first, second and third parts which are hollow and joined with each other in such a way as to sealingly separate the inside and outside thereof. The first and second parts have joining surfaces which are flush with each other and adjoin at a line extending between the inside and outside of the first and second parts. The third part has a joining surface joined with the joining surfaces of the first and second parts. An FIP gasket is interposed between the joining surfaces of the first, second and third parts. The first and second parts have edges extending along the above mentioned line. The above structure may substantially follow the conventional fashion.

In accordance with the present invention, one of the edges is partially cut to provide a chamber surrounded by the first, second and third parts. The FIP gasket has a portion filling the chamber.

The above structure is effective for solving the above noted problems inherent in the prior art devices.

It is accordingly an object of the present invention to provide a novel and improved FIP gasket arrangement which can provide an assured seal for parts which are caused to move relative to each other when heated up to a high temperature or when undergo heating and/or cooling by heat sources of largely different temperatures.

It is a further object of the present invention to provide a novel and improved FIP gasket arrangement of the above described character which is suited for providing a seal for an oil pan, front cover, etc. of an automotive engine.

DETAILED DESCRIPTION OF THE PREFERRED EMBODIMENTS

Figure 12:
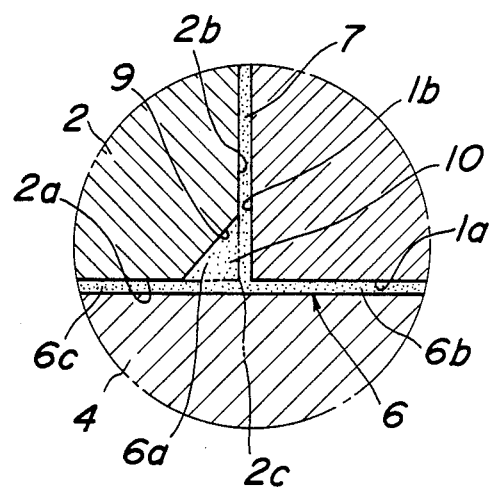
FIG. 12 is a view similar to FIG. 1 but showing an FIP gasket arrangement which is not a prior art but has previously been proposed by the assignee of this application.
Figure 13:
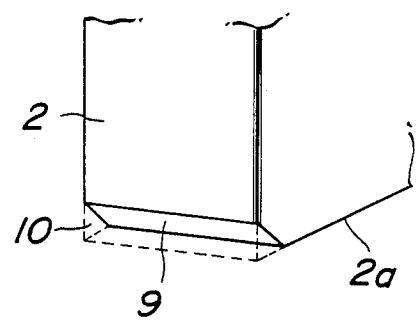
FIG. 13 is a view similar to FIG. 4 but showing a portion of a front cover in the gasket arrangement of FIG. 12.
Figure 14:
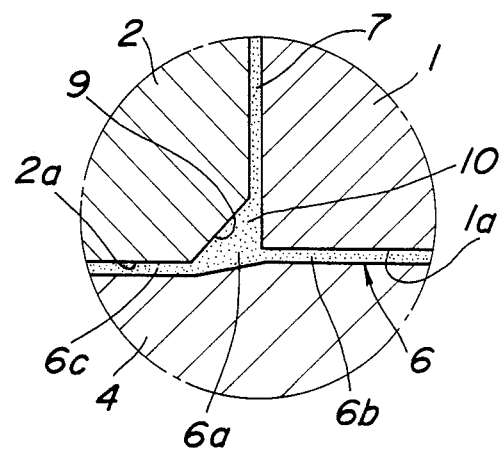
FIG. 14 is a view similar to FIG. 12 but showing the gasket arrangement in a condition into which it is put when heated up to a high temperature.

Referring first to FIGS. 12 to 13, an FIP gasket arrangement having previously been proposed by the assignee of this application will be described. In the gasket arrangement, a cylinder block 1 has first and second joining surfaces 1a and 1b intersecting at right angles at an edge 1c. A front cover 2 has first and second joining surfaces 2a and 2b intersecting at right angles at an edge 2c. The cylinder block 1 and front cover 2 are joined at the second joining surfaces 1b and 2b in such a way as to make the first joining surfaces 1a and 2a flush with each other, i.e., in such a way as to make the joining surfaces 1a and 2a form a single plane and make the edges 1c and 2c meet at a line extending between the inside and outside of the cylinder block 1 and the front cover 2. An oil plan 4 has a joining surface 5 joined with the first joining surfaces 1a and 2a of the cylinder block 1 and front cover 2. In order to overcome the above noted drawbacks, the edge 2c of the front cover 2 is chamferred 9 throughout the length thereof or the front cover 2 is formed at the edge 2c with a recess 9 extending throughout the length thereof so that a chamber 10 is defined by the chamferred edge 9 and the joining surfaces 1b and 5. The chamber 10 therefore extends along and throughout the length of the edge 1c of the cylinder block 1. An FIP gasket material in a liquid state is applied to the joining surfaces 1a, 1b, 2a, 2b and 5 and into the chamber 10 to form a portion 6a in the chamber 10, a portion 6b between the joining surfaces 1a and 5, a portion 6c between the joining surfaces 2a and 5 and a portion 7 between the joining surfaces 1b and 2b when solidifies.

With the above arrangement, relative movement between the joining surfaces 1a and 2a resulting from the foregoing difference in thermal expansion is absorbed by deformation of the gasket portion 6a received in the chamber 10, whereby to prevent the gasket portion 6b from being stripped off from the joining surface 1a of the cylinder block 1.

Although the gasket arrangement described above is effective for overcoming the above noted drawback inherent in the prior art arrangement, it encounters a problem that the gasket portion 6a has a possibility of being forced to flow out of the chamber 10 when subjected to a high pressure either from the inside or outside of the oil pan before it solidifies completely, resulting in an incomplete seal for the oil pan 4.

An FIP gasket arrangement of the present invention is free from the above noted problems and will be described hereinafter with reference to FIGS. 1 to 8.

Figure 1:
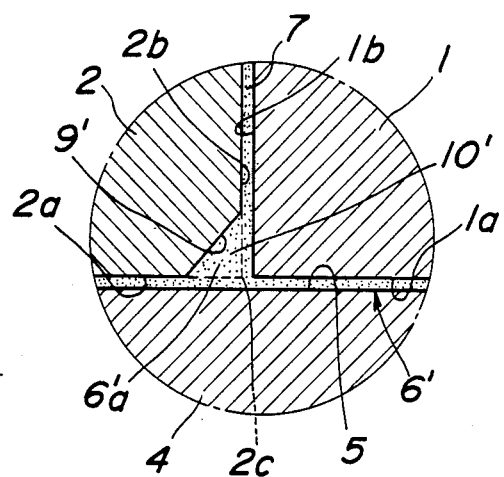
FIG. 1 is a view similar to FIG. 10 but showing an FIP gasket arrangement according to an embodiment of the present invention.

In FIG. 1, a cylinder block 1 is made of cast iron whilst a front cover 2 is made of aluminium alloy. The cylinder block 1 and front cover 2 are joined with an oil pan 4 by interposing therebetween an FIP gasket 6'. As shown in detail in FIGS. 2 and 3, the front cover 2 has a joining surface 2a at a flanged lower end 2d thereof.

Figure 4:
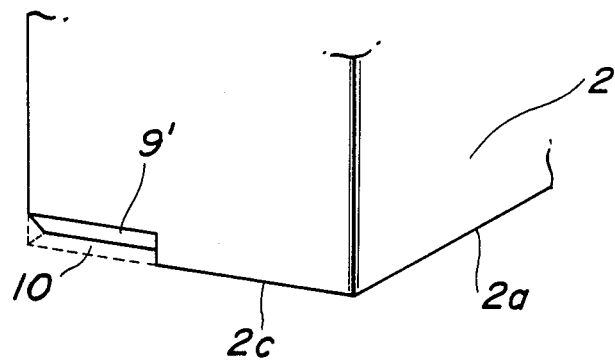
FIG. 4 is an enlarged perspective view of the portion "IV" of FIG. 2.

In accordance with the present invention, the edge 2c of the front cover 2 is partially chamferred 9', i.e., as best shown in FIG. 4, nearly half of the edge 2c located closer to the inside of the front cover 2 is chamferred 9' or formed with a recess 9' so that a chamber 10' is defined by the chamferred or recessed edge 9' and the joining surfaces 1c and 5. The chamber 10' is filled with an FIP gasket material that forms a gasket portion 6a' when solidifies.

With the foregoing structure, the gasket portion 6a' disposed in the chamber 10' absorbs the movement of the joining surfaces 1a and 2a due to the difference in thermal expansion between the cylinder block 1 and front cover 2 and prevents the gasket 6' from being separated from the joining surface 1a of the cylinder block 1, thus making it possible to retain an assured seal for the oil pan 4. In this connection, it is to be noted that the gasket portion 6a' is prevented from being forced to flow out of the chamber 10' before it solidifies completely, even when a large difference in pressure between the inside and outside of the engine occurs, since the edge 2c extending across the joining surface 2a, i.e., extending between the inside and outside of the engine is chamferred only partially.

Figure 5:
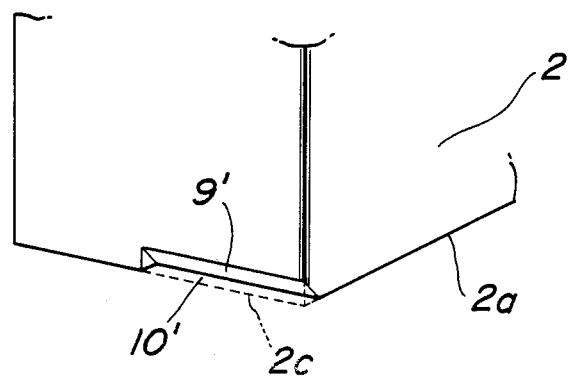
FIGS. 5 to 8 are perspective views similar to FIG. 4 but showing modifications of the present invention.
Figure 2:
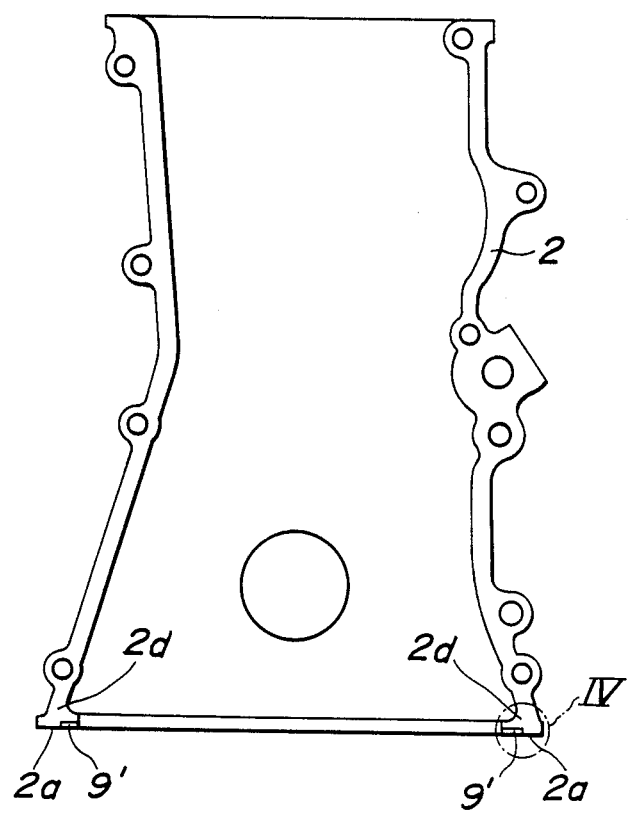
FIG. 2 is an inside elevational view of a front cover.
Figure 3:
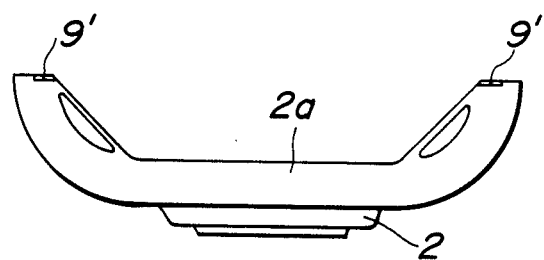
FIG. 3 is a bottom view of the front cover of FIG. 2.

FIG. 5 shows another embodiment in which the edge 2c is partially chamferred 9' at nearly half part thereof located closer to the outside of the engine or outside of the front cover 2.

Figure 6:
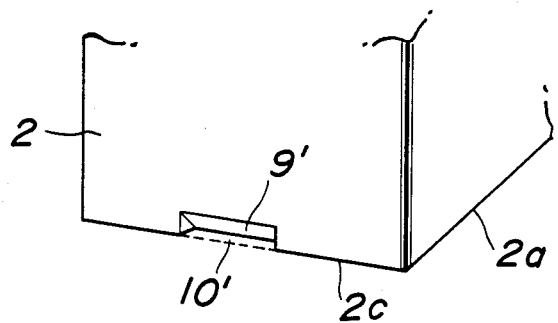

FIG. 6 shows a further embodiment in which the edge 2c is partially chamferred 9' at a central part thereof.

Figure 7:
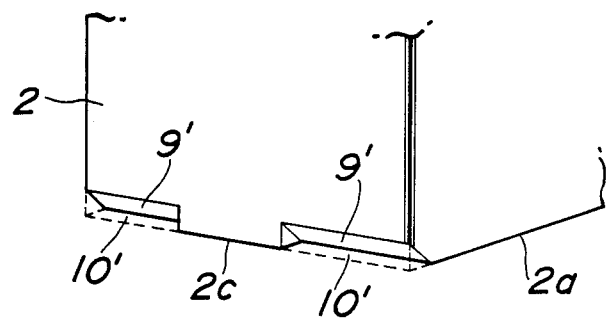

FIG. 7 shows a further embodiment in which the edge 2c is partially chamferred 9' at opposite end portions thereof.

Figure 8:
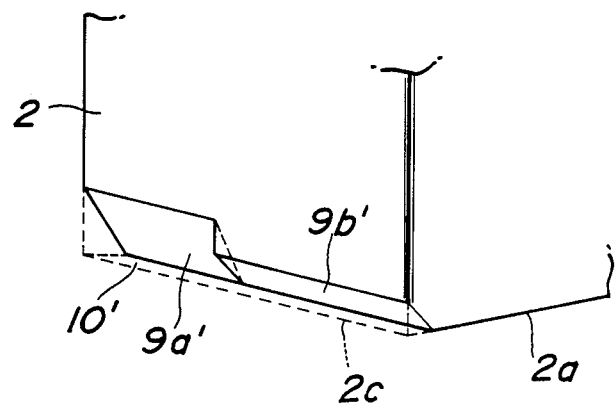
Figure 9:
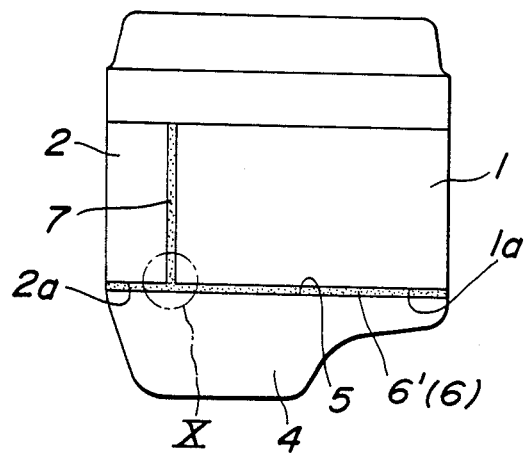
FIG. 9 is a side elevational view of an internal combustion engine in which an FIP gasket arrangement of this invention or a prior art FIP gasket arrangement can be used.
Figure 10:
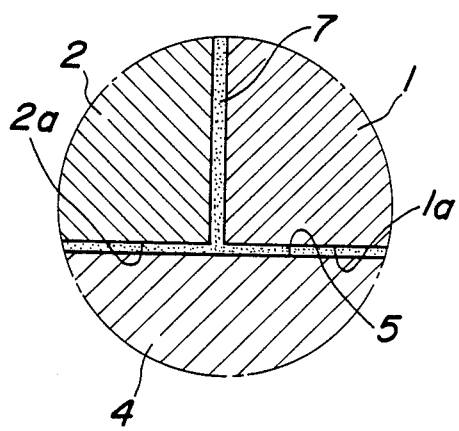
FIG. 10 is an enlarged view of the portion "X" of FIG. 10 and showing a prior art FIP gasket arrangement.
Figure 11:
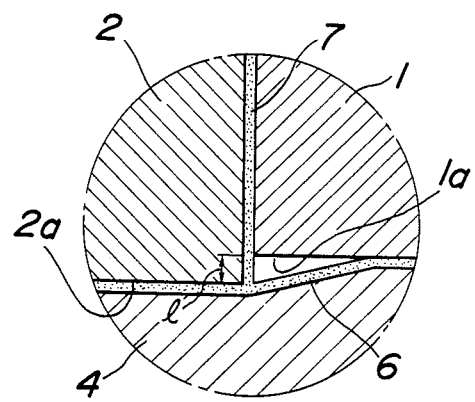
FIG. 11 is a view similar to FIG. 10 but showing the gasket arrangement in a condition into which it may possibly be put when heated up to a high temperature.

FIG. 8 shows a further embodiment in which the edge 2c is formed with a relatively large recess 9a' to form the chamber 10' at a portion thereof and a relatively small recess or slight chamfer 9b' at the remaining portion thereof. The slightly chamferred portion 9b' is so sized that the above described flow-out of the FIP gasket material does not occur even when a large difference in pressure occurs between the inside and outside of the engine before the gasket material cures or solidifies completely.

In the foregoing, while an edge of a front cover has been described and shown to be partially chamferred, this is not limiative. For example, an edge of a cylinder block may be partially chamferred in place therefor or both of the edges may be partially chamferred to define a chamber extending partially across the joining surfaces. Further, in place of chamferring, the edge may be rounded.

What is claimed is:

1. A formed in place (FIP) gasket arrangement comprising:
   first, second and third parts which are hollow and joined with each other in such a way as to sealingly separate the inside and outside thereof;
   said first and second parts having joining surfaces which are flush with each other and adjoin at a line extending between the inside and outside of said first and second parts;
   said third part having a joining surface joined with said joining surfaces of said first and second parts;
   an FIP gasket interposed between said joining surfaces of said first, second and third parts;
   said first and second parts having edges extending along said line;
   one of said edges being partially cut to provide a chamber surrounded by said first, second and third parts;
   said FIP gasket having a portion filling said chamber.

2. An FIP gasket arrangement as set forth in claim 1 wherein said cut portion of said edge is a nearly half portion of same located closer to the inside of said first and second parts.

3. An FIP gasket arrangement as set forth in claim 1 wherein said cut portion of said edge is a nearly half portion of same located closer to the outside of said first and second parts.

4. An FIP gasket arrangement as set forth in claim 1 wherein said cut portion of said edge is a central portion of same.

5. An FIP gasket arrangement as set forth in claim 1 wherein said cut portion of said edge is an end portion of same, and said partially cut edge is further cut at the other end portion thereof to provide a chamber surrounded by said first, second and third parts, said FIP gasket having a portion filling said second mentioned chamber.

6. An FIP gasket arrangement as set forth in claim 1 wherein said cut portion of said edge is a portion which is largely cut, and said edge includes the remaining portion which is slightly cut.

7. An FIP gasket arrangement as set forth in claim 6 wherein said largely cut portion is a nearly half portion of said edge located closer to the inside of said first and second parts.

8. An FIP gasket arrangement as set forth in claim 1 wherein said cut portion of said edge is a chamferred portion.

9. A formed in place (FIP) gasket arrangement comprising:
first, second and third parts which are hollow and joined with each other in such a way as to sealingly separate the inside and outside thereof;
said first part having first and second surfaces intersecting at an edge;
said second part having first and second surfaces intersecting at an edge;
said first and second parts being joined at said second surfaces in such a way as to make said first surfaces flush with each other and said edges meet at a line extending between the inside and outside of said first and second parts;
said third part having a surface joined with said first surfaces of said first and second parts;
an FIP gasket interposed between said first and second surfaces of said first and second parts and said surface of said third part;
one of said edges being partially cut to provide a chamber defined by said cut edge portion of one of said first and second parts, said second surface of the other of said first and second parts and said surface of said third part;
said FIP gasket having a portion filling said chamber.

* * * * *